July 2, 1935.  J. SNEED  2,006,778
BRAKE OPERATING MECHANISM
Original Filed Sept. 12, 1927
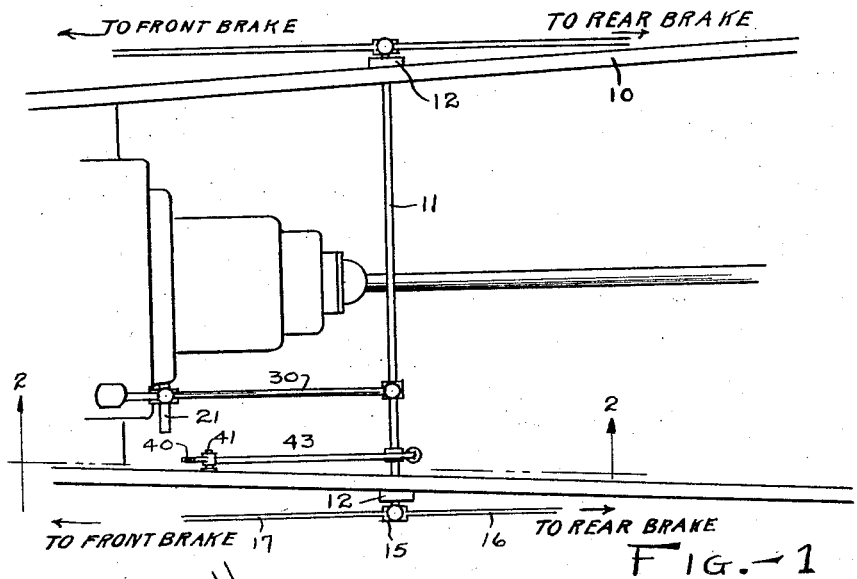
Fig.—1
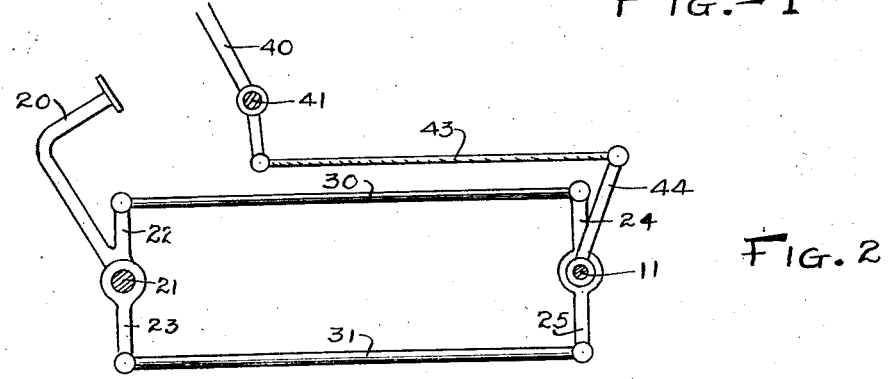
Fig. 2
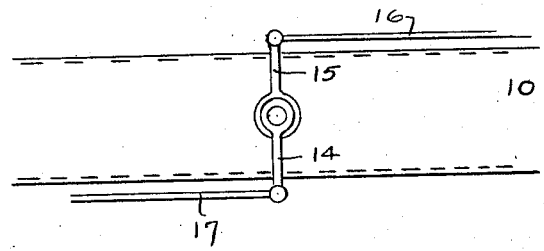
Fig.—3
Inventor
John Sneed
By Bates, Macklin, Golrick, & Teare
Attorneys Patented July 2, 1935

2,006,778

UNITED STATES PATENT OFFICE 2,006,778

BRAKE OPERATING MECHANISM

John Sneed, Grosse Pointe Shores, Mich., assignor to The Midland Steel Products Company, Cleveland, Ohio, a corporation of Ohio Application September 12, 1927, Serial No. 218,874
Renewed February 1, 1933

6 Claims. (Cl. 188—106)

This invention relates to brakes for motor vehicles and more particularly to the linkage or hook-up between the brake operating levers such as the foot pedal or the emergency lever and the brakes proper.

I have found it desirable to operate the wheel brakes in a motor vehicle through a single cross shaft which may be mounted in substantially the mid-portion of the vehicle frame. One of the problems arising from the use of such a cross shaft is that of lateral distortion or bending of the shaft. To avoid such distortion it has been found expedient to mount this cross shaft near a transverse frame member and then support the shaft on a plurality of bearings, so that the shaft be kept straight as it is twisted by application of the foot pedal or hand lever. The difficulty follows that the shaft passing through more than two bearings binds or freezes if it is worked out of alignment through some mischance. It is also found to be costly to align more than two bearings in assembling the vehicle.

It is among the objects of my invention, therefore, to use a single transverse shaft mounted only in bearings at the end of the shaft, but so connected to the brake pedal or other lever that no lateral strain is put upon the shaft during the application of brakes, or so that whatever lateral strain is put upon the shaft is absorbed by means not constituting a middle bearing as such.

Other objects of my invention will appear from the following description of a preferred form thereof; the essential characteristics are summarized in the claims.

In the drawing, Fig. 1 is a plan view of a portion of a motor vehicle including the brake operating hook-up; Fig. 2 is a partial elevation of the hook-up; Fig. 3 is an end view of the cross shaft showing the connections to the brake rods.

Referring particularly to Fig. 1, I designate the vehicle frame 10 with the transverse brake shaft 11 journalled at its ends as at 12. At the ends of the shaft are mounted oppositely extending arms 14 and 15, see Fig. 3, to which are connected brake actuating rods 16 and 17 which lead to the front and rear brakes respectively; although my invention is not concerned with the number of brakes in a vehicle, nor are the brakes as such shown in the drawing.

Referring to Fig. 2, I show a foot pedal 20 pivotally mounted on a shaft 21, and in fixed relation to the foot pedal 20 are arms 22 and 23. The cross shaft 11 is shown to have mounted on it in fixed relation arms 24 and 25. Pivotally connecting the ends of the arms 22 and 24 is a member 30, and pivotally connecting the ends of the arms 23 and 25 is a member 31. The length of these arms may be equal but any desirable proportion may be used consistent within the precepts of my invention. It will suffice to say that the members 31 and 30 and the arms 22, 23, 24 and 25 may preferably but not necessarily act as and move to describe a parallelogram.

It will be seen that when pressure is applied to the foot pedal 20, that the member 30 is put in tension and the member 31 is put in compression to rotate the shaft 11. It is common to rotate the shaft 11 by the equivalent of the tension on the member 30, but rotating the shaft by such means puts a lateral strain on the shaft which I avoid by using the member 31 and delivering to the shaft 11 an unbalanced couple rather than a direct pull. This greatly reduces the fulcrum load on the shaft 21 to an amount not in excess of the pedal pressure.

In the preferred form of my invention, wherein four wheel brakes are operated, the fore and aft brake pull rods 17 and 16 respectively are connected to arms 14 and 15, which may well be of equal length, so that balanced couples are delivered from the ends of the shaft 11. Thus, the bearings 12 take substantially no load because the shaft 11 is put under only torsional strain.

As far as the action of the foot pedal 20 is concerned, the member 30 might be a purely tension member such as a cable, but I prefer to make the member 30 a rigid rod or tube, which will carry compressive strain for the following purposes. I show more or less diagrammatically in Fig. 2 an emergency lever 40 pivotally mounted at 41, having an extending arm 42 to the end of which is pivotally secured a cable 43, which in turn connects with an arm 44, rigid on the shaft 11. In my scheme of operation I use the emergency lever to rotate the shaft 11 and to operate the same brakes as are operated by the foot lever. However, as I do not care to have the emergency lever moved at every application of the foot pedal, I use the cable connection between the emergency lever and the shaft 11. I do find it of practical value to have the foot pedal depressible when the emergency brake is applied, so that both the foot and the hand may be used together in applying or releasing the emergency lever. Of course, the emergency lever may be operated by hand, without regard to the foot pedal.

It will be seen that when the emergency lever is operated, that a lateral strain is put upon the shaft 11, but to compensate for this in place of a bearing, part of the lateral strain is taken through the members 30 and 31, and is put upon the shaft 21 upon which the foot pedal rotates. The rest of the lateral strain is taken through the nearest end bearing 12 at the end of the shaft 11. Referring to Fig. 1, it will be seen that the shaft 21 is comparatively short, and is quite able to carry the lateral strain which might be harmful to the longer shaft 11. During operation of the emergency lever, only a short portion of the shaft 11 between the arms 24 and 25 and the bearing 12 in the left side wheel is subjected to a bending load.

It will be seen from the foregoing that I have provided a connection to the brake shaft which delivers an unbalanced couple rather than a direct pull and relieves the shaft of lateral stresses, and it puts only a torsional strain upon the shaft. One skilled in the art will appreciate that this greatly reduces the strain on the shaft, as well as the wear on the bearings, and it permits the shaft to be supported in only two bearings. The danger of grabbing or freezing because of bending is eliminated. Lighter shafts may be used and there is less need for lubrication in the shaft bearings, consequently many squeaks and rattles and ancillary objectionable features are eliminated.

While I have described and illustrated a preferred form, I do not care to be limited in scope other than by the claims appended hereto.

I claim:

1. In a vehicle having a frame, a cross shaft journaled only at its ends in said frame, a pedal mounted on a pivot fixed in relation to said frame, connections from said shaft adjacent its bearings for operating the brakes of the vehicle and for receiving forces at diametrically opposite points, means for transmitting an unbalanced couple from said pedal to said shaft, and an emergency connection for rotating said shaft engaging said shaft between one of its journals and said means.

2. In a vehicle, the combination of a brake pedal pivotally mounted upon a shaft, a cross shaft journaled at its ends in the frame of the vehicle, said cross shaft having a pair of oppositely extending arms, link members connected to said arms and to said pedal, a second lever mounted on a fixed pivot, an additional arm fixed on said cross shaft, a member connecting said arm to said last named lever and adapted to be drawn by said lever to rotate said cross shaft, said first mentioned members carrying at least part of the lateral strain from said cross shaft to said first named shaft.

3. In a vehicle, the combination of a brake pedal pivoted upon a stub shaft, a cross shaft journaled at its ends in the frame of the vehicle, said cross shaft having a pair of oppositely extending arms remote from its ends, link members connected to said arms and to said pedal at points on opposite sides of said stub shaft, a second lever mounted on a fixed pivot, an additional arm fixed on said cross shaft, a flexible member disposed substantially parallel to said first mentioned link members connecting said arms to said last named lever and adapted to be drawn by said lever to rotate said cross shaft, said first mentioned members transmitting lateral strain from said cross shaft to said first named stub shaft.

4. In a vehicle, the combination of a brake actuating cross shaft, a parallelogram connection for rotating said shaft including a pair of members capable of being loaded in compression, end bearings for said shaft, and an emergency connection for rotating said shaft engaging said shaft between one of said end bearings and the parallelogram connection, said parallelogram connection taking at least part of the lateral load when the shaft is rotated by said emergency connection.

5. In a vehicle, the combination of a brake actuating cross shaft, journaled only at its ends, a lever mounted on a fixed pivot, a pair of links connected between the lever and the shaft and lying on opposite sides of a line joining the said pivot and the shaft and in a plane normal to the shaft, an arm on the shaft between said plane and one of the journaled ends of the shaft, a second lever connected to said arm for rotating the shaft, at least part of the shaft being relieved of external lateral load when rotated by said last named lever.

6. In a vehicle having a frame, a cross shaft journaled at its ends in said frame, a pedal mounted on a pivot fixed in relation to said frame, connections from said shaft adjacent its bearings for operating the brakes of the vehicle, and means for transmitting an unbalanced couple from said pedal to said shaft, in combination with a lever for rotating said shaft, said means taking lateral load from said shaft when it is rotated by said lever and transferring the load to the pedal pivot.

JOHN SNEED.